United States Patent [19]

Angenent et al.

[11] Patent Number: 5,066,086
[45] Date of Patent: Nov. 19, 1991

[54] SEMICONDUCTOR DEVICE COMPRISING A DIRECTIONAL COUPLER FOR THE TE AND TM COMPONENTS

[75] Inventors: Johannes Angenent, Paris; Jean A. Cavailles, Saint-Mande, both of France

[73] Assignee: U.S. Philips Corp., New York, N.Y.

[21] Appl. No.: 558,116

[22] Filed: Jul. 20, 1990

[30] Foreign Application Priority Data

Jul. 28, 1989 [FR] France .................. 89 10189

[51] Int. Cl.$^5$ ............................................. G02B 6/10
[52] U.S. Cl. ...................................................... 385/41
[58] Field of Search ................. 350/96.12, 96.13, 96.14

Primary Examiner—William L. Sikes
Assistant Examiner—Robert E. Wise
Attorney, Agent, or Firm—William L. Botjer

[57] ABSTRACT

An integrated semiconductor device including a directional optoelectronic coupler, which coupler comprises two parallel single-mode rectilinear optical waveguides over a total length D, separated by a small distance d, which coupler also comprises four electrodes of the same conductivity type, two on each waveguide, and at least one other electrode of the opposite conductivity type, characterized in that the coupler has an operation which is independent of the transverse electrical and transverse magnetic radiation components, TE and TM, respectively, present in random proportions in the incoming signal, under the condition in which the structural parameters of the coupler render it possible to ensure that the following relations are true:

$$Z = D/2 \quad \text{(a)}$$
$$\phi_{TE} \cdot L_{CTE} = \phi_{TM} \cdot L_{CTM} \quad \text{(b)}$$
$$L_{CTM}/L_{CTE} = (1 - m/n)/\epsilon = k \quad \text{(c)}$$
$$D/L_{CTM} = [p\sqrt{8}/(1-\epsilon k)]\{1/|\sin[p \cdot \pi/(1-\epsilon k)]|\} \quad \text{(d)}$$

In which relations:

Z is the dimension of each electrode on the waveguides,
$\phi TM$ and $\phi TE$ are the phase mismatches provoked by the refractive-index changes in the waveguides under the influence of an electric field,
$L_{CTE}$ and $L_{CTM}$ are the coupling lengths for TE and TM, respectively,
m, n, p are random integer numbers,
$\epsilon = \pm 1$.

10 Claims, 6 Drawing Sheets

SEMICONDUCTOR DEVICE COMPRISING A DIRECTIONAL COUPLER FOR THE TE AND TM COMPONENTS

BACKGROUND OF THE INVENTION

The invention relates to an integrated semiconductor device including a directional optoelectronic coupler, which coupler comprises two parallel single-mode rectilinear optical waveguides over a total length D, separated by a small so-called coupling distance d, of which waveguides at least one receives a radiation signal at its so-called input end, the coupler further comprising four electrodes of the same conductivity type disposed two by two on each waveguide and at least one other electrode of the opposite conductivity type to permit of the creation of an electric field in the waveguides and, depending on the value of the said electric field, of the passage of the radiation into the waveguide opposed to the input waveguide, which corresponds to the so-called crossover state of the coupler, or of its propagation in the extended direction of entrance, which corresponds to the so-called straight-through state of the coupler.

The invention finds its application in the realisation of switching matrices used in the field of telecommunications.

A directional coupler formed by two parallel strip waveguides is known from the publication entitled "Switched Directional Couplers with Alternating $\Delta\beta$" by H. KOGELNIK et al. in "IEEE Journal of Quantum Electronic, VOL.-QE-12, no. 7, July 1976". This document discloses that such a coupler is characterized by its interaction length and its coupling coefficient. The coupling length, which is inversely proportional to the coupling coefficient, indicates the minimum length necessary to achieve that the radiation passes completely from one waveguide into the other. The crossover is complete when the propagation constants of the waveguides are the same and when the interaction length is an odd multiple of the coupling length. In order to minimize the demands on the dimensions of the device, the cited publication proposes to place four electrodes on the waveguides, two on each waveguide, in order to vary the propagation constant in each of the waveguides in order to, on the one hand command the crossover by the application of a voltage to the electrodes and, on the other hand, obtain the crossover in a wide spectrum of interaction lengths of the device by simply controlling the voltages applied to the electrodes.

The major and inhibitive shortcoming of the known device is that it is strictly limited to use with beams which have only one of the two polarizations TE or TM, TE being the so-called transverse electrical component, i.e. of which the diagrammatic representation is a vector parallel to the plane of the substrate on which the waveguides are integrated and at the same time perpendicular to the direction of propagation, and TM being the so-called transverse magnetic component, of which the diagrammatic representation is a vector which is simultaneously perpendicular to the plane of the substrate and to the direction of propagation of the radiation.

The shortcoming inherent in the known device is on the one hand the result of the fact that the coupling length is different for each of the polarizations TE and TM and on the other hand that the phase mismatch induced by the refractive-index change in the waveguides under the influence of an electric field depends to a very high degree on the initial polarization condition of the beam which is propagated in the waveguides, and also on the orientation of the waveguides on the substrate, at least when the waveguides are realised in III–V material.

Now it is known that the optical fibres usually employed in telecommunications never maintain a polarization condition as initially given over a very long distance. The beam which arrives at an optoelectronic integrated device, therefore, is usually in a random polarization condition.

Under these circumstances the known device cannot be used.

On the other hand, the III–V materials are now the materials of the future for realising optical waveguides in the field of telecommunications on the ground that they are semiconductors, unlike, for example, lithium niobate, and that they therefore permit of the realisation of optoelectronic components, or indeed purely electronic components, in manufacturing synergy, integrated on the same substrate.

SUMMARY OF THE INVENTION

The present invention, therefore, has for its object to provide a directional coupler which is independent of the initial polarization condition of the incoming beam. The result envisaged by the invention is achieved when, by the application of a first electric field value, the two components TE and TM emerge jointly through the waveguide opposite to the input waveguide (crossover state) or emerge jointly through the extension of the input waveguide (straight-through state) with a minimum loss.

Another object of the invention is to provide a coupler realised in a III–V semiconductor material.

Another object of the invention is to provide an optoelectronic switch which has the same performance characteristics as the coupler.

Another object of the invention is to provide a matrix realised by means of the said switch.

According to the invention, these problems are resolved and these objects are achieved by means of a device as described in the heading of claim 1 and further characterized in that the coupler has an operation which is independent of the transverse electrical and transverse magnetic radiation components, TE and TM respectively, present in random proportions in the incoming signal, under the conditions in which the structural parameters of the coupler render it possible to ensure that the following relations are true:

$$Z = D/2 \quad \text{(a)}$$
$$\phi_{TE} \cdot L_{CTE} = \phi_{TM} \cdot L_{CTM} \quad \text{(b)}$$
$$L_{CTM}/L_{CTE} = (1 - m/n)/\epsilon = k \quad \text{(c)}$$
$$D/L_{CTM} = [p\sqrt{8}/(1-\epsilon k)]\{1/|\sin[p\cdot\pi/(1-\epsilon k)]|\} \quad \text{(d)}$$

In which relations:

Z is the dimension of the electrodes on the waveguides,
$\phi_{TM}$ and $\phi_{TE}$ are the phase mismatches provoked by the refractive-index changes in the waveguides under the influence of an electric field for the TM component and the TE component, respectively,
$L_{CTE}$ and $L_{CTM}$ are the lengths necessary for the given polarization components, TE or TM, respectively, introduced into a waveguide to pass into the other waveguide, called hereinafter coupling length for TE and coupling length for TM, m, n, p are random integer numbers, $\epsilon = \pm 1$.

BRIEF DESCRIPTION OF THE DRAWINGS

The invention will now be described in more detail below with reference to the accompanying drawings.

FIG. 3b represents diagrammatically in plan view an example of the arrangement of the electrodes for realising a coupler by means of the waveguides of FIG. 3a.

DETAILED DESCRIPTION OF THE PREFERRED EMBODIMENTS

Figure 1:
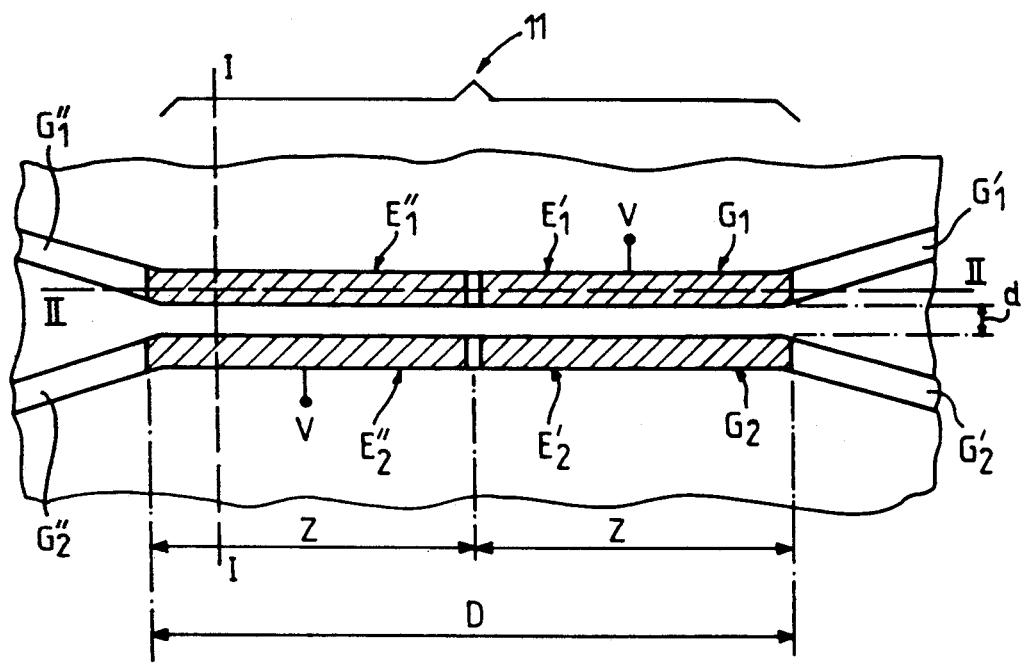
FIG. 1 represents diagrammatically in plan view an embodiment of a directional coupler according to the invention.

FIG. 1 shows an integrated semiconductor device realised on a substrate 10, comprising at least a first input waveguide $G'_1$, and an optical second input waveguide $G'_2$, two output waveguides among which a first output waveguide called $G''_1$ and a second output waveguide called $G''_2$, and a directional optoelectronic coupler 11.

The optoelectronic coupler 11 comprises two rectilinear optical waveguide portions $G_1$ and $G_2$, which are parallel and have the same lengths D, of which the first is so arranged as to connect the first input waveguide $G'_1$ to the first output waveguide $G''_1$, and the second $G_2$ is connected at one end to the second output waveguide $G''_2$ and at the other end to the second input waveguide $G'_2$, if the latter exists.

Two identical electrodes $E'_1$ and $E''_1$ are disposed at the surface of the first portion of the rectilinear waveguide $G_1$. Opposite these electrodes, on the second portion of the rectilinear waveguide $G_2$, there are arranged two other identical electrodes $E'_2$ and $E''_2$. The electrodes have a length Z. The four electrodes $E'_1$, $E''_1$, $E'_2$, $E''_2$ are of the same conductivity type, for example p.

The device further comprises one or several electrodes of the opposing conductivity type n to render possible the creation of an electric field in the waveguides by the application of a voltage between the p and n electrodes.

In order to have the coupler shown in FIG. 1 function, a first voltage is applied between the electrodes n and p to obtain the so-called straight-through or parallel state, and a second voltage to obtain the so-called crossover state.

Only two electrodes among those which are realised in the surface of the waveguides will be used, the other two are only present for the sake of symmetry. One single electrode will be used for each waveguide, each electrode being chosen so as not to be directly opposite the other electrode used. These two electrodes of the same conductivity type must be electrically interconnected for the application of the potential between them and the electrodes of the second conductivity type.

In order to have the device function, the choice between the pair $E'_1$, $E''_2$ and the pair $E''_1$, $E'_2$ is free. The electrodes of the second conductivity type are preferably disposed in the device in order to produce the desired electric field. Examples of embodiments will be given below.

The object of the invention is therefore to make possible the use of such a coupler, not as it is known in the present art, with the input of a signal comprising a single component, TE or TM, but with the input of a signal comprising the two components, TE and TM, in random proportions. According to the invention, it should be possible to recuperate the total power input at the output of the coupler at one or the other waveguide, depending on whether the straight-through or the crossover state obtains.

The objects of the invention are achieved if and only if the parameters defining the structure of the coupler render it possible to ensure that the relations, which will be given below, are true.

It will be assumed that those skilled in the art of optoelectronics know that for a power input $P_a$ at, for example, the input end of the waveguide $G_1$ through input portion $G'_1$ the following holds:

$$P_a = (1-2B^2)^2 \quad (1)$$

$$\text{with } B^2 = [K^2/(K^2 + \delta^2)] \sin^2\{\sqrt{K^2 + \delta^2} \cdot Z\} \quad (2)$$

$$\text{and } K = \pi/2L_c \quad (3)$$

$L_c$ being the coupling length of any of the components. and also $$\delta = (\pi/2)(\phi/Z) \tag{4}$$

$\phi$ being the total phase mismatch along the length D,
Z being the length of one electrode arranged on one of the waveguides of the coupler.

For the two components TE and TM to remain jointly in a single waveguide, it is necessary that:
in the crossover state, the power $P_a$ of TE is equal to the power $P_a$ of TM and equal to 0, which is written as:

$$P_{aTE} = P_{aTM} = 0 \tag{5}$$

in the straight-through state, the power $P_a$ of TE is equal to the power $P_a$ of TM and equal to 1, which written as:

$$P_{aTE} = P_{aTM} = 1 \tag{6}$$

The phase mismatch is proportional to the distance travelled in a waveguide, which can be expressed by:

$$\phi = \epsilon D \tag{7}$$

in which is a proportionality coefficient.

In the following description, the electrodes $E'_1$ and $E''_1$ on the one hand, and $E'_2$ and $E''_2$ on the other hand are very close to one another, with a small space in between just sufficient to avoid short-circuits. The dimension of this small space is negligible in relation to the length D. In this way it is achieved that a first condition for the operation of the device according to the invention is resolved:

$$a)\ Z = D/2 \tag{8}$$

in which Z is the length of each of the electrodes $E'_1$, $E''_1$, $E'_2$, $E''_2$.

To establish the relations necessary for the operation of the device it is stipulated:

$$k_1 = L_{CTM}/L_{CTE} \tag{9}$$

$$k_2 = \phi_{TE}/\phi_{TM} \tag{10}$$

$\phi_{TM}$ and $\phi_{TE}$ are the phase mismatches generated by the refractiveindex changes in the waveguides under the influence of an electric field for the TM component and for the TE component, respectively. These are the structural quantities which can be measured by methods known to those skilled in the art.

$L_{CTE}$ and $L_{CTM}$ are the lengths necessary for the given polarization component, TE or TM, respectively, introduced into a waveguide to pass into the other waveguide, to be called hereinafter coupling length for TE and coupling length for TM. $L_{CTE}$ and $L_{CTM}$ are structural quantities which can be measured by methods known to those skilled in the art.

Starting from equation (2) one can now write for the component TE:

$$B^2 = (a^2/a^2 + 4\phi^2) \sin^2\{(\pi/4)\sqrt{a^2 + 4\phi^2}\} \tag{11}$$

and for the component TM:

It has already been explained that these quantities must be equal for TE and TM in the case in which the coupler is in the straight-through state (parallel), i.e. $P_a = 1$, and in the case in which the coupler is in the crossover state, i.e. $P_a = 0$. This means that the following equations must be solved: first in the straight-through (parallel) state $$P_a = 1$$

$$B = 0.$$

For the component TE:

$$a^2 + 4\phi_1^2 = 16m_o^2 \tag{13}$$

in which $m_o$ is an integer and for the component TM:

$$(a/k_1)^2 + 4(\phi_1/k_1)^2 = 16 \tag{14}$$

in which $n_o$ is an integer.

Then in the crossover state:

$$P_a = 0$$

$$B = \tfrac{1}{2}$$

for the component TE:

$$[a^2/(a^2 + 4\phi_2^2)] \sin^2((\pi/4\sqrt{a^2 + 4\phi_2^2}) = 1/2 \tag{15}$$

and for the component TM:

$$(a/k_1)^2/[(a/k_1)^2 + 4(\phi_2/k_2)^2]\sin^2)$$

In the above equations, $\phi_1$ and $\phi_2$ are the respective phase mismatches necessary for putting the coupler in the straight-through (or parallel) state and in the crossover state for the component TE.

A whole family of parameters $k_1$, $k_2$ and $a$ exists for which the equations (13) and (14) have solutions for $\phi_1$ and $\phi_2$. This family of parameters can be determined by calculation in a simple manner by all those skilled in the art.

An analytical description is given below of a particular preferred embodiment according to which the condition is fulfilled:

$$k_1 = k_2 = k \tag{17}$$

that is to say, the condition:

$$b)\ \phi_{TE} \cdot L_{CTE} = \phi_{TM} \cdot L_{CTM} \tag{18}$$

In physical terms, these conditions can be interpreted as follows: the cumulative phase mismatch over a length equal to the coupling length is independent of the polarization.

To simplify the calculations, new relations are introduced. It is stipulated:

$$\phi_C = \delta/K = \phi \cdot L_C/Z$$

According to the starting hypothesis, $\phi_C$ is independent of the polarization, which means that:

$$\phi_{CTE} = \phi_{CTM} = \phi_C \tag{19}$$

The equations (11) and (12) are then rewritten:

$$B_{TE}^2 = (1/(1 + \phi_C^2)) \sin^2 \{\sqrt{1 + \phi_C^2} \, (D/L_{CTE})(\pi/4)\} \quad (20)$$

$$B_{TM}^2 = (1/(1 + \phi_C^2)) \sin^2\{(\pi/4)(D/L_{CTM})\sqrt{1 + \phi_C^2}\} \quad (21)$$

From this it follows that the condition $P_{aTE}=P_{aTM}$ is fulfilled if:

$$(\pi/4)(D/L_{CTM})\sqrt{1 + \phi_C^2} = \epsilon(\pi/4)(D/L_{CTE})\sqrt{1 + \phi_C^2} + m_1\pi \quad (22)$$

in which m1 is an integer and $\epsilon = \pm 1$. The equation (22) can be put in the form:

$$(\pi/4)(1 - \epsilon k_1)(D/L_{CTM})\sqrt{1 + \phi_C^2} = m_1\pi \quad (23)$$

This condition obviously depends on $\phi_C$. In the case of the invention, it is the object only to have $B_{TE}=B_{TM}$ in the straight-through and crossover states.

Study of the Straight-Through (or Parallel) State

The straight-through (or parallel) state is defined by a certain value of $\phi_C$ which will be written as $\phi_{C1}$ and which is such that:

$$B^2_{TE}=B^2_{TM}=0$$

which entails, starting from the equations (20) and (21) that:

$$1/(1 + \phi_{C1}^2) \sin^2\left((\pi/4)(D/L_{CTM})\sqrt{1 + \phi_{C1}^2}\right) = 0 \quad (24)$$

or:

$$(\pi/4)(D/L_{CTM})\sqrt{1 + \phi_{C1}^2} = n\pi \quad (25)$$

in which n is an integer. From the equation (23) follows, to achieve that $B_{TE}=B_{TM}$ $$(\pi/4)(D/L_{CTM})\sqrt{1 + \phi_{C1}^2} = m\pi \quad (26)$$

in which m is an integer The relation between the equation (26) and the equation (25) means that:

$$(1-\epsilon k)=m/n \quad (27)$$

in which m and n are integers. The following condition necessary for the invention can be derived:

$$c) \; k=(1-m/n)/\epsilon \quad (28)$$

in which m and n are integers and $\epsilon = \pm 1$

The equation (28) shows that, if $k_1$ has the indicated form, it is possible to achieve simultaneously the straight-through (or parallel) states for the two components TE and TM, whatever the values of the other parameters may be.

Study of the Crossover State

The crossover state is defined by a certain value of $\phi_C$ which will be written as $\phi_{C2}$ and which is such that:

$$B_{TE}^2=B_{TM}^2=\tfrac{1}{2}$$

from which follows, starting from the equations (20) and (21) that:

$$1/(1 + \phi_{C2}^2) \sin^2\left((\pi/4)D/L_{CTM}\sqrt{1 + \phi_{C2}^2}\right) = 1/2 \quad (29)$$

From the equation (23) follows:

$$(1-\epsilon k)(D/L_{CTM})^2[1/(m_2^2 \cdot 16)] \\ \sin^2\{m_2 \cdot \pi/(1-\epsilon k)\} = \tfrac{1}{2} \quad (30)$$

in which m2 is an integer. from which follows that:

$$(D/L_{CTM})^2 = 8m^2/(1-\epsilon k)[1/\sin^2\{m(\pi/1-\epsilon k)\}] \quad (31)$$

in which m2 is an integer and $\epsilon = \pm 1$. From this can be derived the fourth condition to be fulfilled for the invention:

$$d) \; D/L_{CTM} = p \cdot \sqrt{8} \, /(1 - \epsilon k) \{1/|\sin[p \cdot \pi/(1 - \epsilon k)]|\} \quad (32)$$

in which p is an integer and $\epsilon = \pm 1$.

Thus we have a set of permitted values given by the equation (32) for the ratio $D/L_{CTM}$.

It will be noted that there is only a solution if $(m_2\pi)/(1-\epsilon k)$ is not a multiple of $\pi$, that is to say if m2 is not a multiple of $1-\epsilon k$.

Conclusion of this Preliminary Study

It is possible to construct a coupler independent of the polarization in the two extreme states, straight-through and crossover, in all cases provided the following conditions are fulfilled:

$$a) \; Z = D/2 \quad (8)$$

$$b) \; \phi_{TE} \cdot L_{CTE} = \phi_{TM} \cdot L_{CTM} \quad (18)$$

$$c) \; L_{CTM}/L_{CTE} - (1 - m/n)/\epsilon = k \quad (28)$$

$$d) \; D/L_{CTM} = p \sqrt{8} \, /(1 - \epsilon k) \cdot \{1/|\sin[p\pi/(1 - \epsilon k)]|\} \quad (32)$$

in which m, n are random integers, p is an integer $\epsilon = \pm 1$ All these quantities can be measured by conventional techniques known to those skilled in the art.

EXAMPLE I

The invention will preferably be realised by choosing $$k=2 \quad (33)$$

(see equations 9, 10, 17). From which follows that the condition c) is expressed by $$L_{CTM}=2L_{CTE} \quad (34)$$

In this case $$m=3, n=1, \epsilon=-1 \quad (35)$$

The result is that the condition d) is expressed by $$D/L_{CTM} = p \cdot \sqrt{8} /3 \{1/ |\operatorname{Sin}| p\pi/3||\}$$

or $$D/L_{CTM} = 1,089 p \qquad (36)$$

The preferred choice will be $$p = 2 \qquad (37)$$

from which follows the condition $$D/L_{CTM} \approx 2,177 \qquad (38)$$

Other cases (k=3, etc.) will not be discussed since those skilled in the art can easily implement them on the model of the example I described above.

It follows from a), b), c) and d) that, if k=2:

$$\phi_{TE} = 2\phi_{TM} \qquad (39)$$

and that $$D/L_{CTE} \approx 4,354 \qquad (40)$$

The total length D of the coupler 11, the distance d which separates the rectilinear portions of waveguides $G_1$ and $G_2$ in the coupler, the choice of materials, their doping and the structure of the optical waveguides (external stripn waveguides or others) are so many factors which those skilled in the art can vary in order to fulfil the conditions for realising this embodiment, these conditions being expressed now by the equations (8), (34), (39) and (40):

a) $Z = D/2$ (8)
b') $L_{CTM} = 2 L_{CTE}$ (34)
c') $\phi_{TE} = 2 \phi_{TM}$ (39)
d') $D/L_{CTE} \approx 4,354$ (40)

In this example I, the directional coupler corresponds to the diagram of FIG. 1 as far as the plan view is concerned. It conforms to the diagram of FIG. 2a in its transversal cross-section taken on the line I—I, and to the diagram of FIG. 2b in its longitudinal section taken on the line II—II.

In order to achieve b'), that is the desired proportion between $L_{CTE}$ and $L_{CTM}$, those skilled in the art can influence the coupling distance d which separates the rectilinear portions of the waveguides $G_1$ and $G_2$ as well as the transversal dimension W of the waveguides and the height h of the strip, if the structure chosen includes strip waveguides.

In order to achieve c'), that is the desired proportion between $\phi_{TE}$ and $\phi_{TM}$, those skilled in the art can vary the choice of doping of the layers and the structure of the waveguides constituting the coupler 11, as well as the direction of the waveguides relative to the substrate. Especially the doping levels of the guiding layer and the layers forming the p-n structure governing the refractive-index change in relation to the voltage applied between the electrodes p-n make it possible to adjust the ratio between $\pi_{TE}$ and $\pi_{TM}$.

Figure 2A:
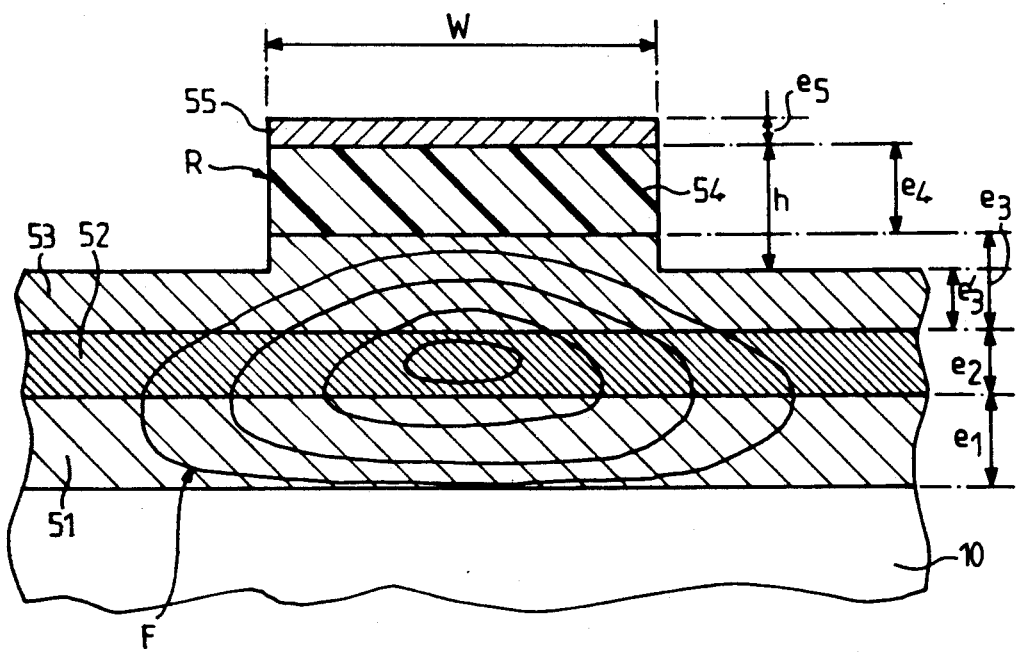
FIG. 2a represents diagrammatically in cross-section taken on the line I—I of FIG. 1 an embodiment of an optical waveguide provided with an electrode.

To fulfil the conditions a), b'), c'), d') in this example I in such a way as shown in cross-section in FIG. 2a, each rectilinear optical waveguide $G_1$, $G_2$ of the coupler 11 comprises in that order:

A/ a substrate 10, which may be of a semi-isolating material III-V, such as GaAs or InP, or which may be of a III-V material of the n+ conductivity type, for example InP doped with at least $10^{17}$ at/cm$^3$, for example $10^{18}$ at/cm$^3$. The substrate may also be made of silicon provided with, for example, layers for adapting the lattice parameters to III-V materials.

B/ a first epitaxial layer 51 of indium phosphide InP of the n+ conductivity type, obtained by doping with $10^{17}$ at/cm$^3$. If the substrate 10 is of a different structure, the layer 51 is indispensable and preferably has a thickness $e1 \approx 1$ µm.

C/ a second epitaxial layer 52, called the guiding layer, of a III-V material of the composition $$Ga_xIn_{1-x}As_yP_{1-y}$$

In this composition, there is a relation between the x and y concentrations known to those skilled in the art $$x = 0,23y$$

The concentration is preferably chosen to be $$y = 0,6$$

The guiding layer 52 of GaInAsP is also doped with $10^{17}$ at/cm$^3$ to obtain the n+ conductivity type. The wavelength associated with the forbidden band energy is then $\lambda_{gap} = 1,3$ µm, and the operating wavelength of the waveguides is in the chosen band for the telecommunication application $\lambda_0 = 1,52$ µm.

The guiding layer 52 preferably has a thickness $e2 \approx 0,4$ µm.

D/ a third layer 53 of indium phosphide InP of the n⁻ conductivity type, obtained by doping with at most $10^{16}$ at/cm$^3$. This layer 53 will have a total thickness $e3 \approx 0,5$ µm at the moment of its realisation.

E/ a fourth layer 58 of indiumphosphide Ip of the p+ conductivity type obtained by doping with $3.10^{17}$ at/cm$^3$, with the function of forming a p-n junction with the preceding layer 53. This fourth layer 54 of the p+ type preferably has a thickness $e4 \approx 1,05$ µm.

As is shown in cross-section in the same FIG. 2, each waveguide comprises furthermore a ribbon or strip structure R with the object of delimiting the guiding region.

The strip R is generally realised by engraving the upper layers 54 and 53 by any method for engraving a III-V material known to those skilled in the art, but preferably by dry engraving, such as the RIE method, which makes it possible to obtain flat edges perpendicular to the layers. The engraving depth for the waveguides in the layer 52 will favourably be $$h = 1,2 \mu m$$

It is important that on top of the guiding layer 52 remains a thickness of material 53

$$e' \approx 0,35 \mu m.$$

The transversal dimension w of the waveguide ribbons is favourably in the order of $w \approx 3$ µm to 5 µm for transporting a single-mode wave.

The differences in refractive-index caused by the differences in thickness in the region provided with ribbon and in the regions on either side of the ribbon cause the radiation to remain inside the guiding layer 52 and under the strip R, in other words, guide it. Owing to the differences in refractive-index caused by the differences in thickness, all this happens as if the "guided" portion were surrounded by two zones of lower reftactive-index serving as a confinement. FIG. 2 shows in cross-section the isoenergy lines which are the result for the waveguided luminous fluxes F.

Finally, the rectilinear waveguide portions $G_1$ and $G_2$ are provided with a metal layer 55, for example of gold (Au), which is chosen on account of its low optical losses, with a thickness $e5 \approx 0,3$ μm to realise the contacts of the ptype on the upper layer 54 of the p-type. These contacts are arranged so as to form the electrodes E'1, E'2, E"1, E"2, as shown in FIG. 1 seen from above, with special precaution to provide an interspacing of approximately 5 μm, in the 2–20 μm range, between the electrodes E'1, E"1 and E'2, E"2 in order to avoid short-circuits.

A favourable method for realising this structure is in fact to realise first the electrodes on the surface of the layer 54, then to engrave the layer 54 of the ptype and the upper portion of the layer 53 of the n⁻type, using the metal of the electrodes as an engraving mask.

Figure 2B:
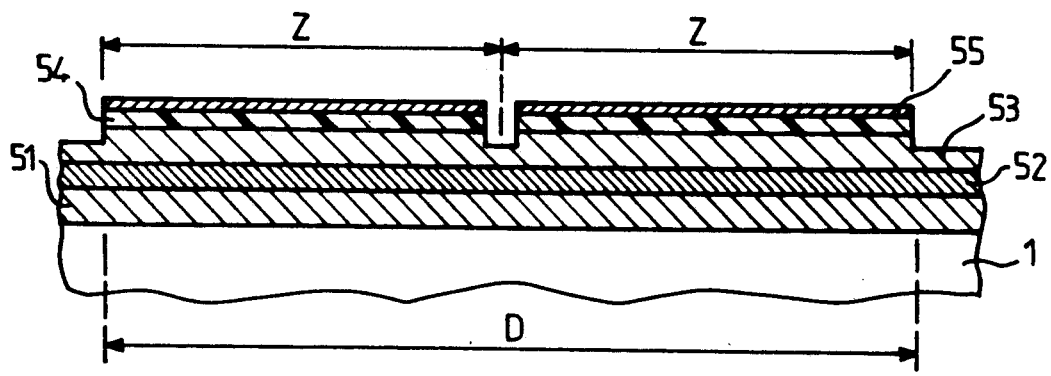
FIG. 2b shows the same waveguide in cross-section taken on the line II—II.
Figure 6:
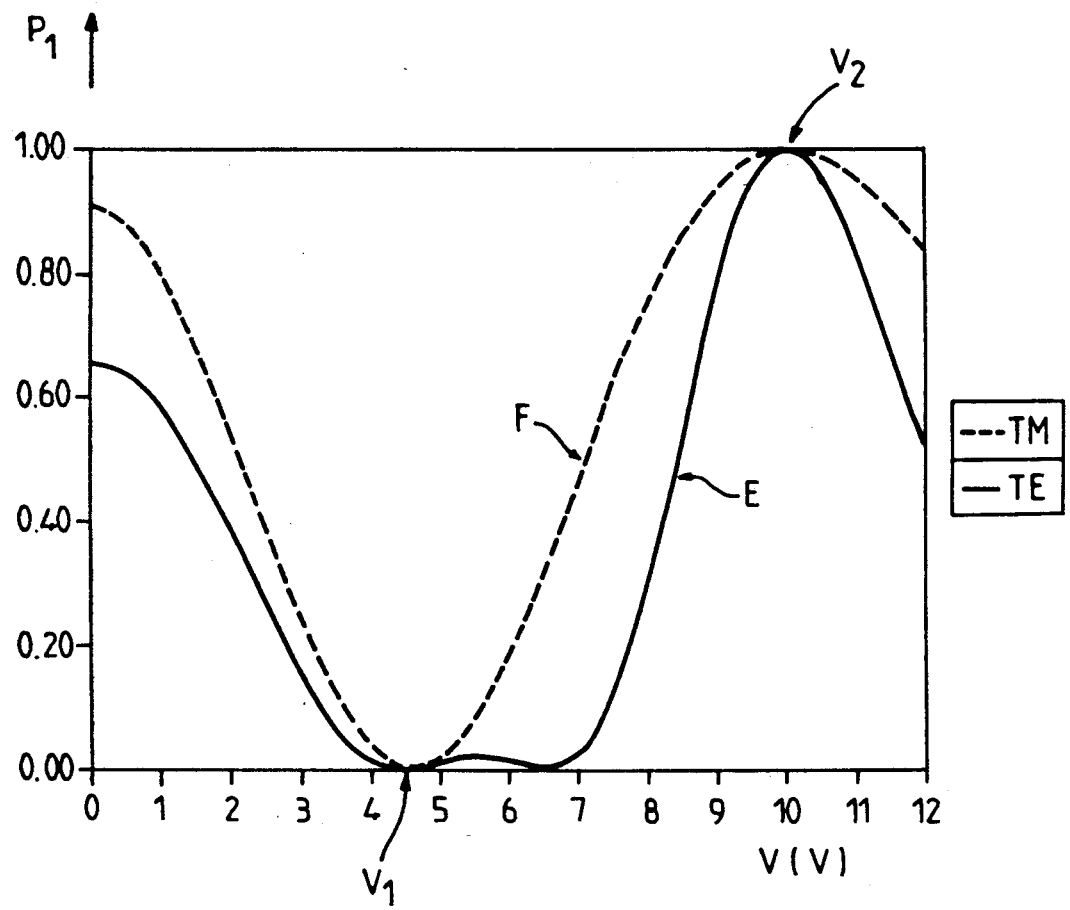
FIG. 6b represents, again under the conditions of the examples I and II, the output power $P_1$ of the input waveguide plotted on the abscissa as a function of the voltage V applied between the n-type electrodes and the p-type electrodes. The full-drawn curve E shows the output power of the TE component, and the broken-line curve F shows the output power of the same waveguide for the TM component.

FIG. 2b, which is a layer taken on the line II—II, shows the device obtained by means of this manufacturing procedure.

If the electric field necessary for the operation of the device is to be created, contacts of the n-type must furthermore be provided.

If the substrate is of the ntype, these contacts may be realised on either of the surfaces of the substrate. If the substrate is of another type, an opening will be made in the layers up to the first layer 51 of the ntype, and a contact $E_0$ of the ntype will be realised on this layer in this opening by any method known to those skilled in the art, for example by means of a metal stud, for example of gold/nickel (Au/Ni).

The III-V semiconductor materials recommended for realising this device are particularly favourable for several reasons.

Firstly, they allow of the synergy of the manufacture of different devices on a single substrate.

Furthermore, they permit of less costly silicon (Si) substrates, provided that some method for adapting the lattice between the silicon substrate and the III-V device, of which is already known nowadays, is applied by those skilled in the art.

Moreover, they are attuned to the wavelength range adapted to telecommunications.

In this embodiment, the conditions a), b'), c') and d') are fulfilled with the structure described above for the coupling distance between waveguides $d = \approx 4,5$ μm the transversal dimension of the waveguides $W = \approx 3$ to 5 μm $L_{CTE} \approx 1,8$ μm
$L_{CTM} \approx 3,6$ μm
$D = 8$ mm $\approx 4,4 \, L_{CTE\,2} = 4$ mm
$\phi_{TE} \approx 15°/\sqrt{mm}$
$\phi_{TM} \approx 7,5°/\sqrt{mm}$ These latter data depend to a very important degree on the doping of the layers.

In fact, when the electric field in the guiding layer 52 is increased, this layer is depleted, which reduces the doping and increases the refractive-index in the said guiding layer. This effect is independent of the polarization of the light beam.

Two other effects also influence the change in refractive-index in the waveguides: the Pockels effect, which depends on the polarization and only influences the TE component; and the Kerr effect, which is independent of the polarization.

In the present invention, the effect of the electric field on the quaternary layer is particularly interesting. It makes it possible to change the refractive-index and the phase mismatch. This is because the $\phi_{TM}/\phi_{TE}$ ratio depends strongly on the doping of the quaternary layer. This ratio also depends on the thickness of the layers because, for a given voltage applied between the electrodes, the created electric field will vary if the distance between the layers p and n, on which the electrodes are disposed, varies. The most advantageous situation is the one in which is $\phi_{TM}$ is greatest.

Figure 4A:
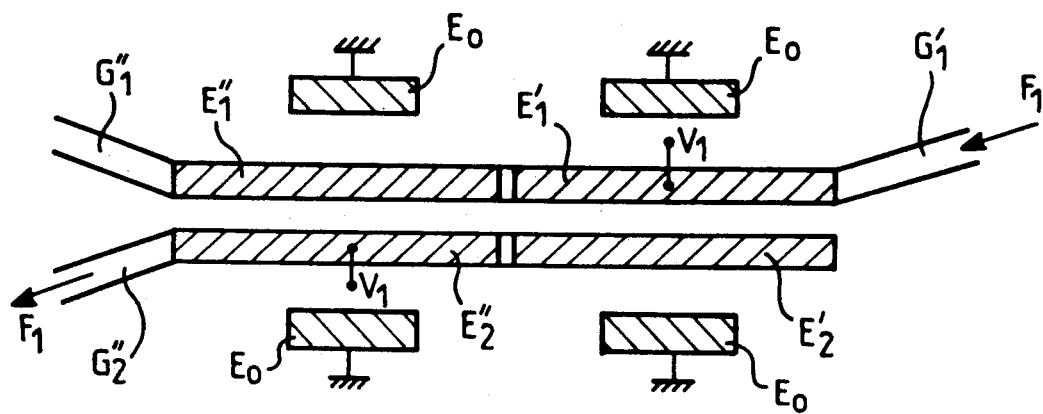
FIG. 4a shows diagrammatically the path of an incoming beam $F_1$ when the coupler is in the crossover state, in plan view.

Under these conditions the coupler is in the CROSSOVER STATE owing to the application of a voltage between the electrodes n and p of $V_1 = -4,5 \text{volts.}$ In this crossover state, illustrated in FIG. 4a, the two polarizations TE and TM emerge jointly through the second output waveguide $G''_2$ if a random polarization flux F1 is injected into the input waveguide $G'_1$.

It should be noted that the n-type electrode can be favourably connected to earth, while the voltage $V_1$ can be applied to one of the sets of electrodes of the ptype E'1, E"2, or E"1, E'2.

Figure 4B:
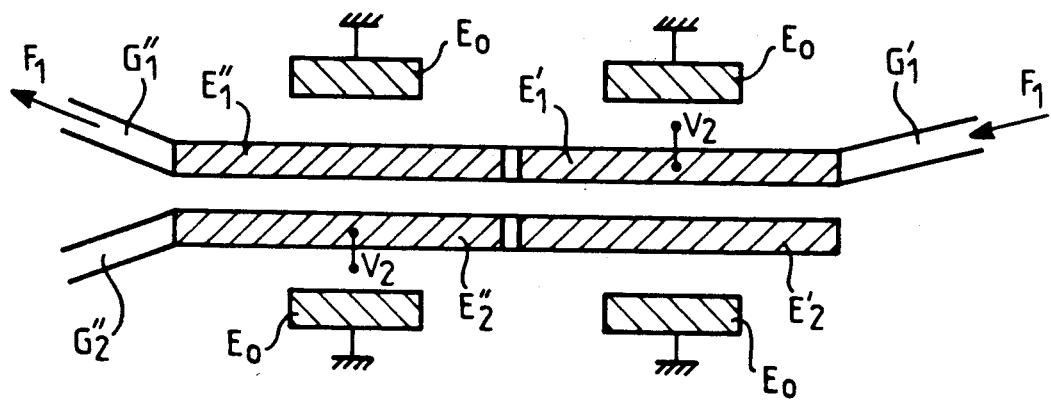
FIG. 4b shows diagrammatically in plan view the path of a beam $F_1$ when the coupler is in the straight-through state.

Under the above conditions, on the other hand, the coupler is in the STRAIGHT-THROUGH (OR PARALLEL) STATE by the application of a voltage between the electrodes n and p of $V_2 = -10,1 \text{volts.}$ In this straight-through state, illustrated in FIG. 4b, the two polarizations TE and TM emerge jointly through the first output waveguide $G''_1$ if a random-polarization flux F1 is injected into the input waveguide $G'_1$. The voltage $V_2$ can be applied in the same way as the voltage $V_1$.

Figure 5A:
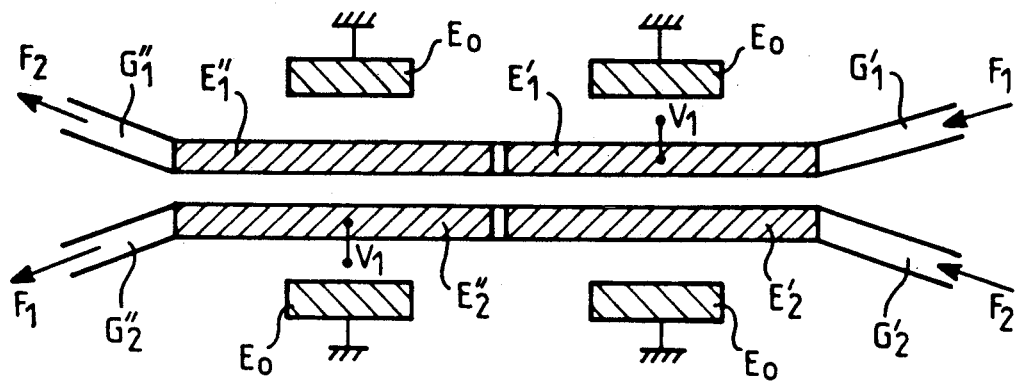
FIG. 5a shows diagrammatically in plan view the paths of two beams $F_1$ and $F_2$ in a switch functioning according to the principle of the preceding coupler, in the crossover state.

FIG. 5a illustrates the case in which the coupler is provided with a second input waveguide $G'_1$. It can then function as a switch. When the voltage $V_1 \approx -4,5 \text{Volts}$ is applied between the electrodes, a flux F1 entering through the input waveguide $G'_1$ exits through the opposing waveguide $G''_2$, and a flux F2 entering in the input waveguide $G''_1$ exits through the other waveguide $G'_2$. The switch is in the CROSSOVER STATE.

Figure 5B:
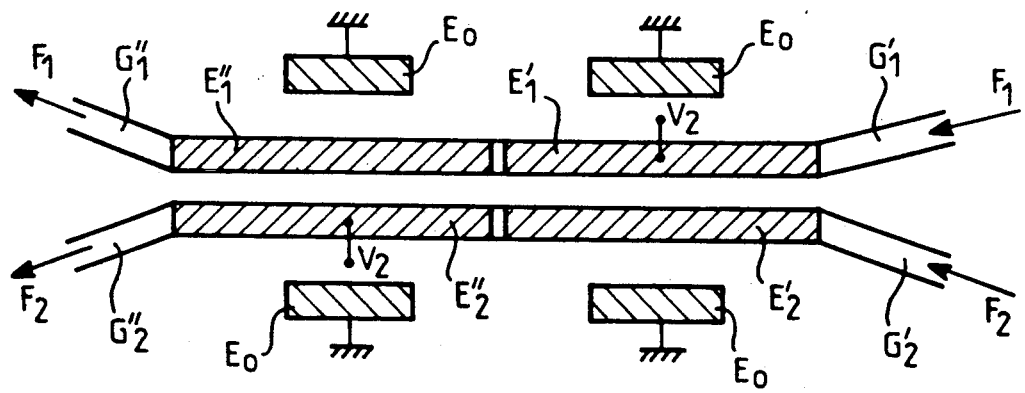
FIG. 5b shows diagrammatically in plan view the paths of two beams $F_1$ and $F_2$ in a switch functioning according to the principle of the coupler of FIGS. 4, in the straight-through state.

FIG. 5b illustrates the case in which the switch is in the STRAIGHT-THROUGH STATE through the application of the voltage $V_2 \approx -10,1 \text{Volts}$ between the electrodes. The flux F1 entering through the input waveguide $G'_1$ continues its path through the rectilinear portion $G_1$ and exits through the output waveguide $G''_1$. Similarly, the flux F2 enters through the input waveguide $G'_2$, continues its path through the rectilinear portion G₂ and exits through the output waveguide G″₂.

The coupler functions as a switch through the application of the voltages V₁ and V₂ under exactly the same conditions as described above, i.e. between a set of electrodes of the ptype, for example E′1, E″2 or E′2, E″1, and an electrode of the ntype, possibly connected to earth.

It should be noted that a single electrode of the ntype is sufficient for the operation of the device. In practice, four electrodes of the ntype as close as possible to the electrodes of the ptype will preferably be provided, as shown in FIGS. 4 and 5, in order to reduce the resistance and make the device symmetrical.

Figure 6A:
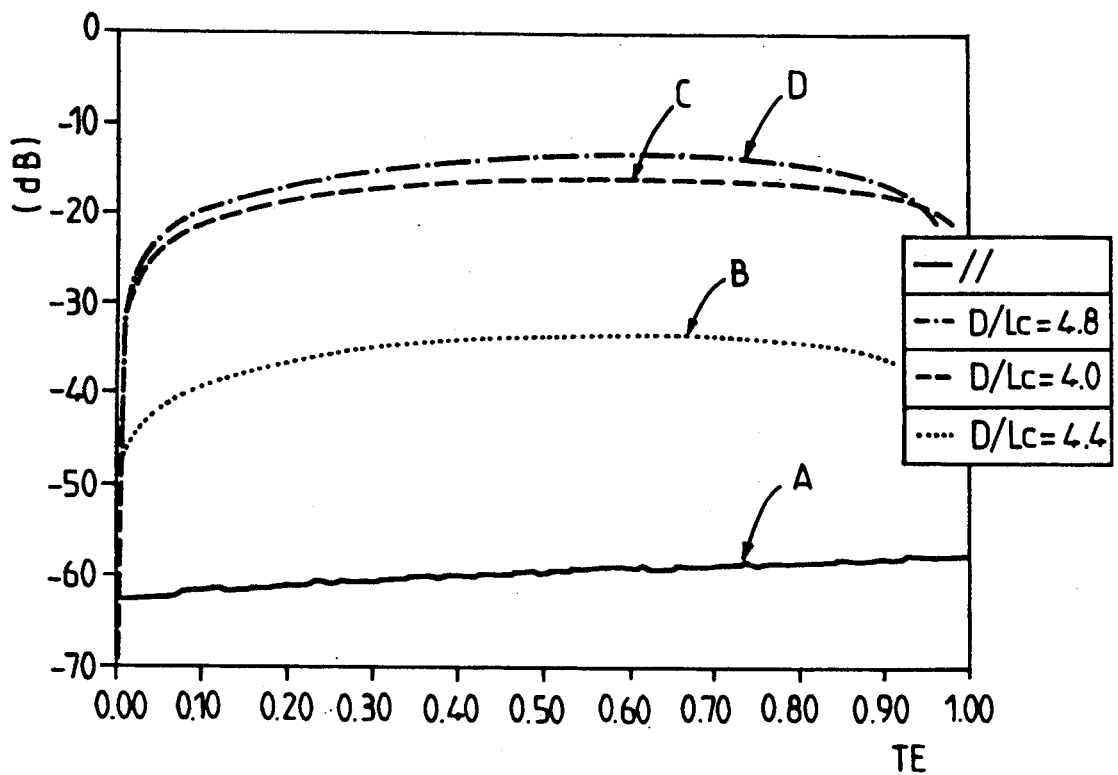
FIG. 6a represents graphically the ratio $P_1/P_2$ and the ratio $P_2/P_1$ in dB, in which $P_1$ is the output power of the first waveguide of the coupler and $P_2$ is the output power of the second waveguide of the coupler for an input power $P_0 = 1$ in the first waveguide, as a function of the percentage of the TE component at the input. Of the curves of FIG. 6a, the curve A represents the ratio $P_2/P_1$ when the coupler is in the straight-through state, and the curves B, C, D represent the ratio $P_1/P_2$ when the coupler is in the crossover state for the values $D/L_{CTE}=4,4$ (curve B), $D/L_{CTE}=4,0$ (curve C), and $D/L_{CTE}=4,8$ (curve D), respectively, under the conditions of the examples I and II.

FIGS. 6a and 6b illustrate the results which may be expected from a coupler or switch described in this example I.

FIG. 6a depicts graphically the ratios $P_2/P_1$ or $P_1/P_2$ in dB, $P_1$ being the output power of the first waveguide of the coupler or switch 11 through G″₁, and $P_2$ being the output power of the second waveguide of the coupler or switch 11 through G″₂, for an input power $P_0=1$ in the first input waveguide G′₁, as a function of the percentage of the TE component in this input, under the conditions in which $\phi_{TM}/\phi_{TE} = 0,5$ and $L_{CTM}/L_{CTE} = 2$ Among the curves of FIG. 6a, the curve A represents the ratio $P_2/P_1$ when the coupler is in the straight-through (or parallel) state. It is to be understood that the representation of the TE component on the abscissa indicates that, if the TE component accounts for 100% in the input signal with the power $P_0$, the TM component is then 0%, and vice versa. The curve A shows that the ratio is in the order of $-60$ dB and that it depends very little both on the initial polarization state and on the ratio $D/L_{CTE}$.

The dotted curve B shows the ratio $P_1/P_2$ in the case in which the coupler or switch is in the crossover state. This curve B shows that the ratio is in the order of $-35$ dB when the ratio $D/L_{CTE}=4,4$. This curve, therefore, shows the conformity of the results obtained to the results calculated.

The broken-line curves C and D show the ratio $P_1/P_2$ in the case in which the coupler or switch is in the crossover state and when the $D/L_{CTE}$ ratio equals 4,0 and 4,8, respectively. The $P_1/P_2$ ratio is then $-15$ dB, which is still quite acceptable and even very good for a number of applications.

It may be concluded, therefore, that the device gives completely satisfactory results in the range $4,0 > D/L_{CTE} > 4,8$ Outside these values less good results are to be expected. These curves show those skilled in the art the way towards choosing the best conditions for a particular envisaged application.

The curves of FIG. 6b graphically show the power $P_1$ at the output of the first waveguide through G″₁ when the input power $P_0$ is injected through G′₁, as a function of the voltage V (volts) applied between the electrodes of the n and ptype, and under the following conditions $D/L_{CTE} = 4,4$
$D = 8$ mm
$\phi_{TM}/\phi_{TE} = 0,5$
$L_{CTM}/L_{CTE} = 2$
$\phi_{TE} = 15°/V \cdot mm$ The full-drawn curve E represents the variations of the TE component, while the broken-line curve F shows the variations of the TM component.

These curves show that in the conditions described above, and for a voltage $V_1 = -4,5$ volts, there is absolutely no radiation anymore in the extension of the first output waveguide G″₁, all radiation being present in the second output waveguide G″₂, for the TE polarization as well as for the TM polarization, and that for this value $V_1$ the device is in the crossover state.

These curves also show that for a value $V_1 = -10,1$ volts the two components TE and TM emerge jointly through the first output waveguide G″₁ and that the device is in the straight-through (or parallel) state.

Finally, these curves show that in the absence of any voltage applied between the electrodes n and p, i.e. for $V = 0$ volts, only a part of the components TE and TM is waveguided by the first waveguide G′₁, G₁, G″₁. The rest of the signal is lost or passes through G″₂.

EXAMPLE II

The curves of FIGS. 6a and 6b show that the dimensions of the device 11 are not critical to the extent of rendering it difficult to realise. On the contrary. Example II also profits from the fact that the device gives good results in a range of dimensions which is wide enough to present a device of a particularly ingenious form, so that the realisation is made even easier.

Figure 3A:
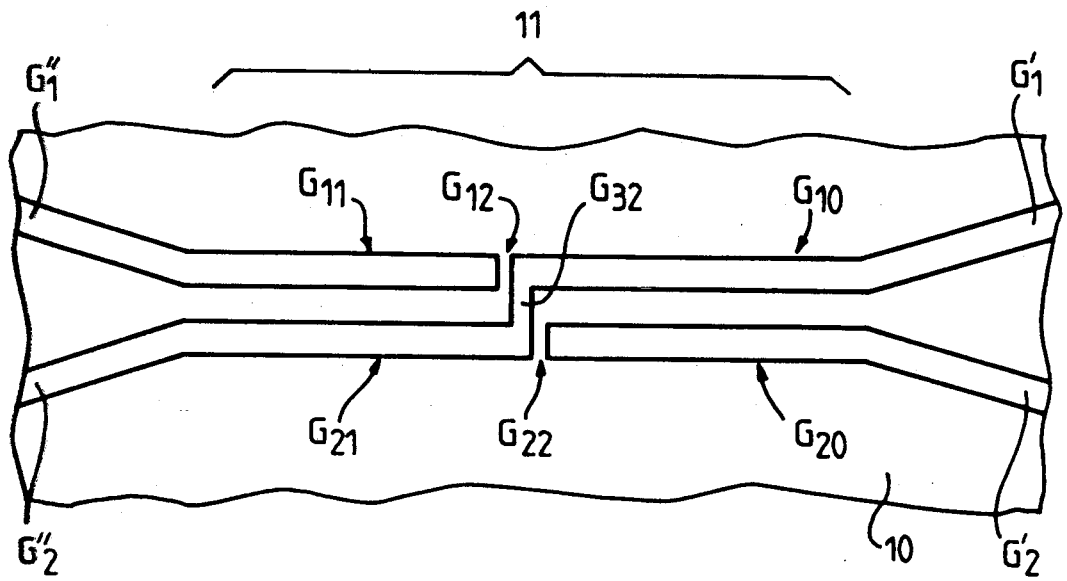
FIG. 3a represents diagrammatically in plan view another example of the arrangement of the optical waveguides for realising a coupler according to the invention.
Figure 3B:
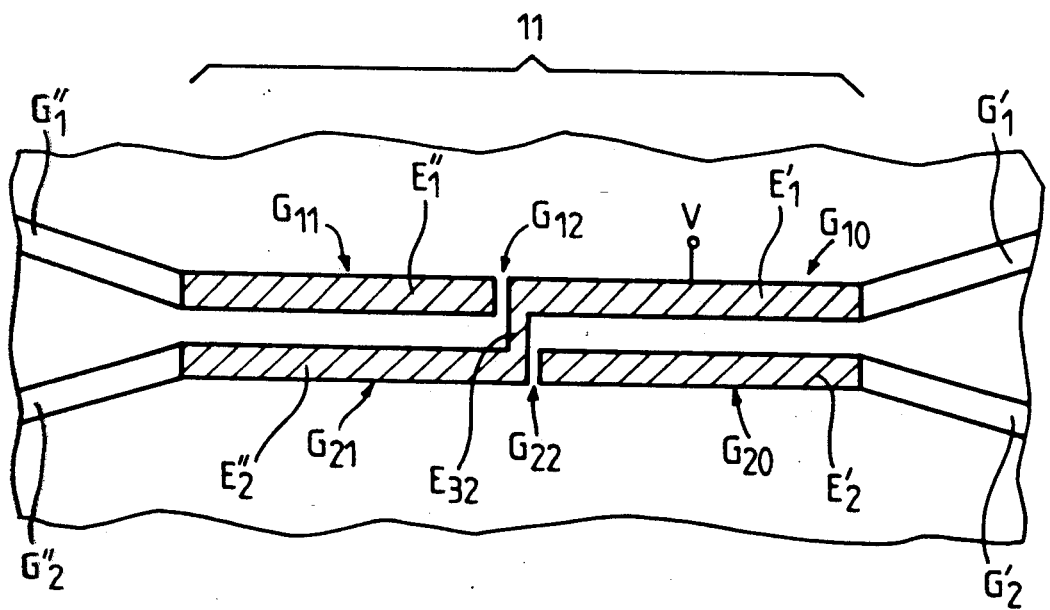

This example is illustrated by the FIGS. 3a and 3b.

Since the length of the device 11 is $D = 8mm$, a small overhang of a few μm is permitted on the length $Z = D/2 = 4$ mm of the electrodes.

The device 11 is realised by the manufacturing process described above for example I. The metallizations of the electrodes E′1, E′2, E″1, E″2 serve as engraving masks for the waveguide strips up to the n⁻ layer 53 in order to avoid short-circuits with the layer p.

Thanks to this process, a cut G₁₂ is realised in the strip of waveguide G₁, so that two parts G₁₀ and G₁₁ are obtained separated no more than by approximately 5 μm, as has been stated for example I, which cut cannot disturb the beam under these conditions. Similarly, a cut G₂₂ is made in the strip of the waveguide G₂, which leaves between these two cuts the passage for a strip section G₃₂ covered by a metal layer 55, which connects the two electrodes E′₁ and E″₂ in a simple manner. The signal is no longer disturbed by the portion G₃₂ and a single electrical contact is then sufficient for applying the voltage to the electrode pair E′₁, E″₂. The transversal dimension of the connection G₃₂, E₃₂ will favourably be in the order of 3 to 5 μm.

Obviously, the connection between the electrodes can be realised between E′₁, E″2, as desired, or, alternatively, between E″₁, E′₂, the non-connected pair not being operational.

The ends of the input waveguides G′₁, G′₂ and the output waveguides G″₁, G″₂ have been drawn in a general way in the various Figures. In fact, it is sufficient for these waveguides to be spaced apart by a distance much in excess of the coupling distance d at a short distance beyond the coupling length in order that the results expected of the coupler or switch are obtained.

The switches according to the invention are particularly aimed at realising switching matrices with N inputs and N outputs, as disclosed in, for example, the publication "Photonic Switches and Switch Areas on LiNbO₃" in "Optical and Quantum Electronics", 21, 1989 by A. SELVARAJAN and J. E. MIDWINTER, edited by CHAPMAN et al, pp. 1–15 with the advantage that it is not necessary to select one component, TE or TM, before input into the matrix in order to achieve the operation of the latter.

We claim:

1. An integrated semiconductor device including a directional optoelectronic coupler, which coupler comprises two parallel single-mode rectilinear radiation waveguides over a total length D, separated by a small so-called coupling distance d, of which waveguides at least one receives a radiation signal at its so-called input end the coupler further comprising four electrodes of the same conductivity type disposed two by two on each waveguide and at least one other electrode of the opposite conductivity type to permit of the creation of an electric field in the waveguides and, depending on the value of the said electric field, of the passage of the radiation into the waveguide opposed to the input waveguide, which corresponds to the so-called crossover state of the coupler, or of its propagation in the extended direction of entrance, which corresponds to the so-called straight-through state of the coupler, characterized in that the coupler has an operation which is independent of the transverse electrical and transverse magnetic radiation components, TE and TM respectively, present in random proportions in the incoming signal, under the conditions in whcih the structural parameters of the coupler render it possible to ensure that the following relations are true:

$$Z = D/2 \quad (a)$$
$$\phi_{TE} \cdot L_{CTE} = \phi_{TM} \cdot L_{CTM} \quad (b)$$
$$L_{CTM}/L_{CTE} = (1 - m/n)/\epsilon = k \quad (c)$$
$$D/L_{CTM} = [p\sqrt{8}/(1 - \epsilon k)]\{1/|\sin[p \cdot \pi/(1 - \epsilon k)]|\} \quad (d)$$

In which relations:
Z is the dimension of the electrodes on the waveguides,
$\phi_{TM}$ and $\phi_{TE}$ are the phase mismatches provoked by the refractive-index changes in the waveguides under the influence of an electric field for the TM component and the TE component, respectively,
$L_{CTE}$ and $L_{CTM}$ are the lengths necessary for the given polarization components, TE or TM, respectively, introduced into a waveguide to pass into the other waveguide, called hereinafter coupling length for TE and coupling for TM,
m, n, p are random integer numbers,
$\epsilon = \pm 1$.

2. A device as claimed in claim 1, characterized in that the various structural parameters of the coupler are chosen in such a way that:

$k=2$, from which follows b') $L_{CTM} = 2 L_{CTE}$
c') $\phi_{TE} = 2 \phi_{TM}$
d') $D/L_{CTE} \approx 4{,}354$.

3. A device as claimed in claim 2, characterized in that among the structural parameters of the coupler the following are chosen:
the coupling distance between waveguides $d \approx 4{,}5$ μm
the transversal dimension of the waveguides $W \approx 3$ to 5 μm
the total longitudinal dimension of the coupler D=8 mm with
$4{,}0\ L_{CTE} \leq D \leq 4{,}8\ L_{CTE}$
$L_{CTE} \approx 1{,}8$ μm
$L_{CTM} \approx 3{,}6$ μm the dimension of the electrodes $Z = D/2 \approx 4$ mm.

4. A device as claimed in claim 3, characterized in that the waveguides are formed by a quanternary guiding layer of the formular $GA_xIn_{1-x}As_yP_{1-y}$, in which x and y are concentrations in the ratio x=0,23 y, the quaternary layer being disposed between two layers of indium phosphide (InP) on a substrate of adapted lattice, the doping of the quanternary layer being of the n+ type in the order of $10^{17}$ at/cm³, while the doping of the subjacent InP layer is of the n type in the order of $10^{17}$ at/cm³, and the doping of the upper InP layer is of the n type in the order of $10^{16}$ at/cm³, the upper InP layer being covered by a layer of InP doped p with $3.10^{17}$ at/cm³, in that the guiding strips are formed in the upper layer of the p type up to the InP layer of the n type, and in that the electrodes are realised on the one hand in the surface of the ptype strips and, on the other hand, on the surface of portions of the subjacent InP layer of the n type.

5. A device as claimed in claim 4, characterized in that the thickness of the quaternary guiding layer is in the order of $e2 \approx 0{,}4$ μm, the thickness of the upper InP layer of the n⁻ type is in the order of $e3 \approx 0{,}5$ μm in the region of the strips and $e'3 \approx 0{,}35$ μm at the outside of the strip, the thickness of the upper layer of the strip of the p type is in the order of $e4 = 1{,}05$ μm, the height of the strip under the electrodes of the p type is in the order of $h = \approx 1{,}2$ μm, the strip being interrupted between two consecutive electrodes realised on the same waveguide to avoid short-circuits with the layer of the p type.

6. A device as claimed in claim 5, characterized in that $\phi_{TM} = 7{,}5°/Vmm$ $\phi_{TE} = 15°/Vmm$ in that besides the electrodes of the n type only one pair of electrodes of the p type situated diametrically opposite one another on the waveguides at a rate of one per waveguide is used for applying the potential necessary for the creation of the electric field, and in that the application between the n and p electrodes of a potential $V_1 = -4{,}5$ V puts the coupler in the crossover state and
$V_2 = -10{,}1$ V puts the coupler in the straight-through (parallel) state.

7. A device as claimed in claim 6, characterized in that the concentration y=0,6 in the composition of the quanternary layer.

8. A device as claimed in claim 6, characterized in that a strip waveguide portion provided with the metal p-type electrode layer is disposed in the stripless interval which separates two adjoining electrodes of the p type on a single rectilinear waveguide of the coupler, in order to connect electrically the two operational electrodes of the ptype of the pair.

9. A device as claimed in claim 1, characterized in that the substrate is chosen from among the semiconductor materials of the III—V group and silicon, for example, provided with lattice adaptation layers.

10. A device as claimed in claim 1, characterized in that the two waveguides of the coupler receive at their input ends a radiation signal in order to carry out the function of an optoelectronic switch.

* * * * *